Dec. 15, 1964  S. P. KISH  3,161,555
METHOD OF MAKING PLASTIC FIXTURES
Original Filed Dec. 19, 1958  8 Sheets-Sheet 1
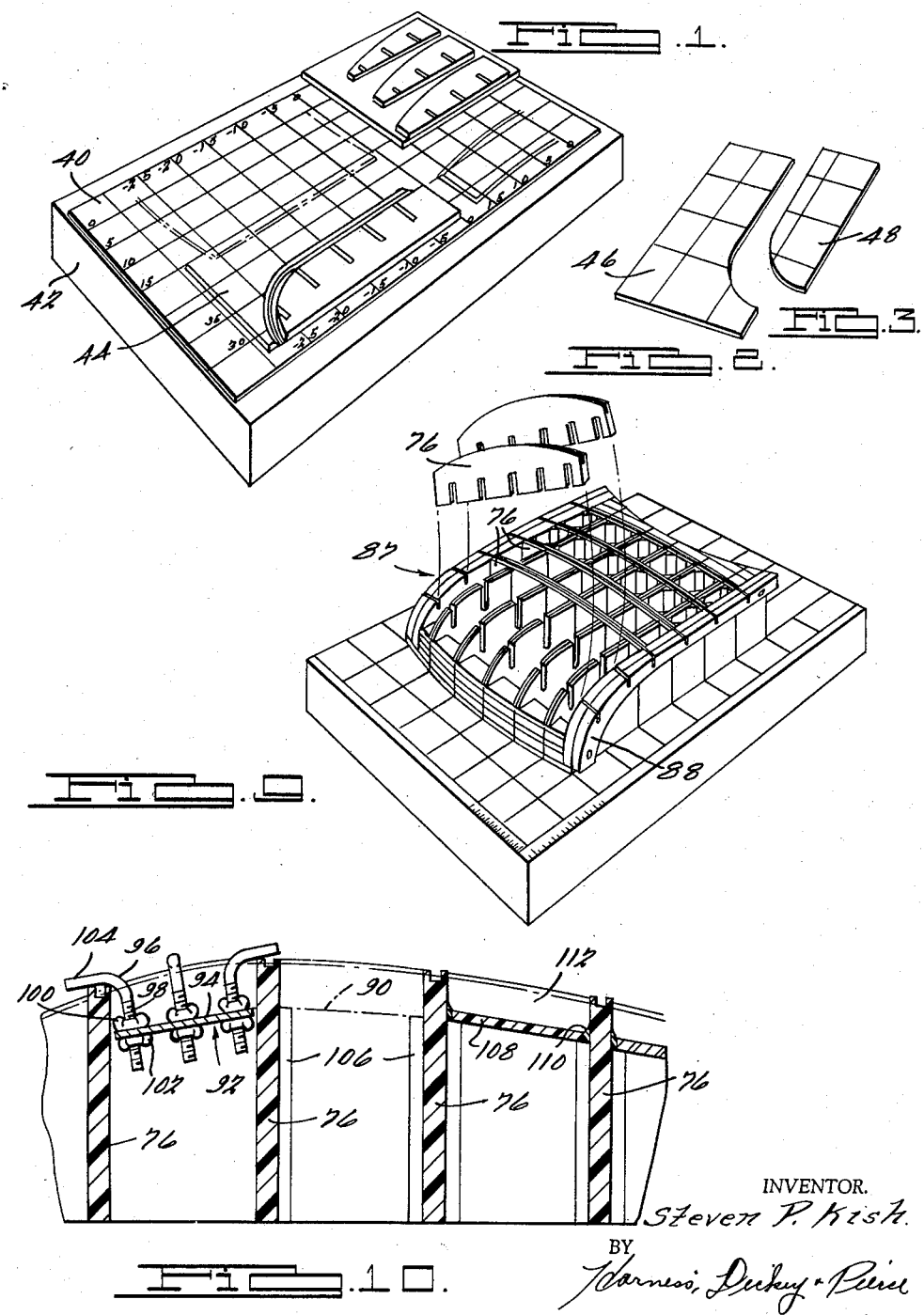
INVENTOR.
Steven P. Kish.
BY
Harness, Dickey & Pierce
ATTORNEYS.

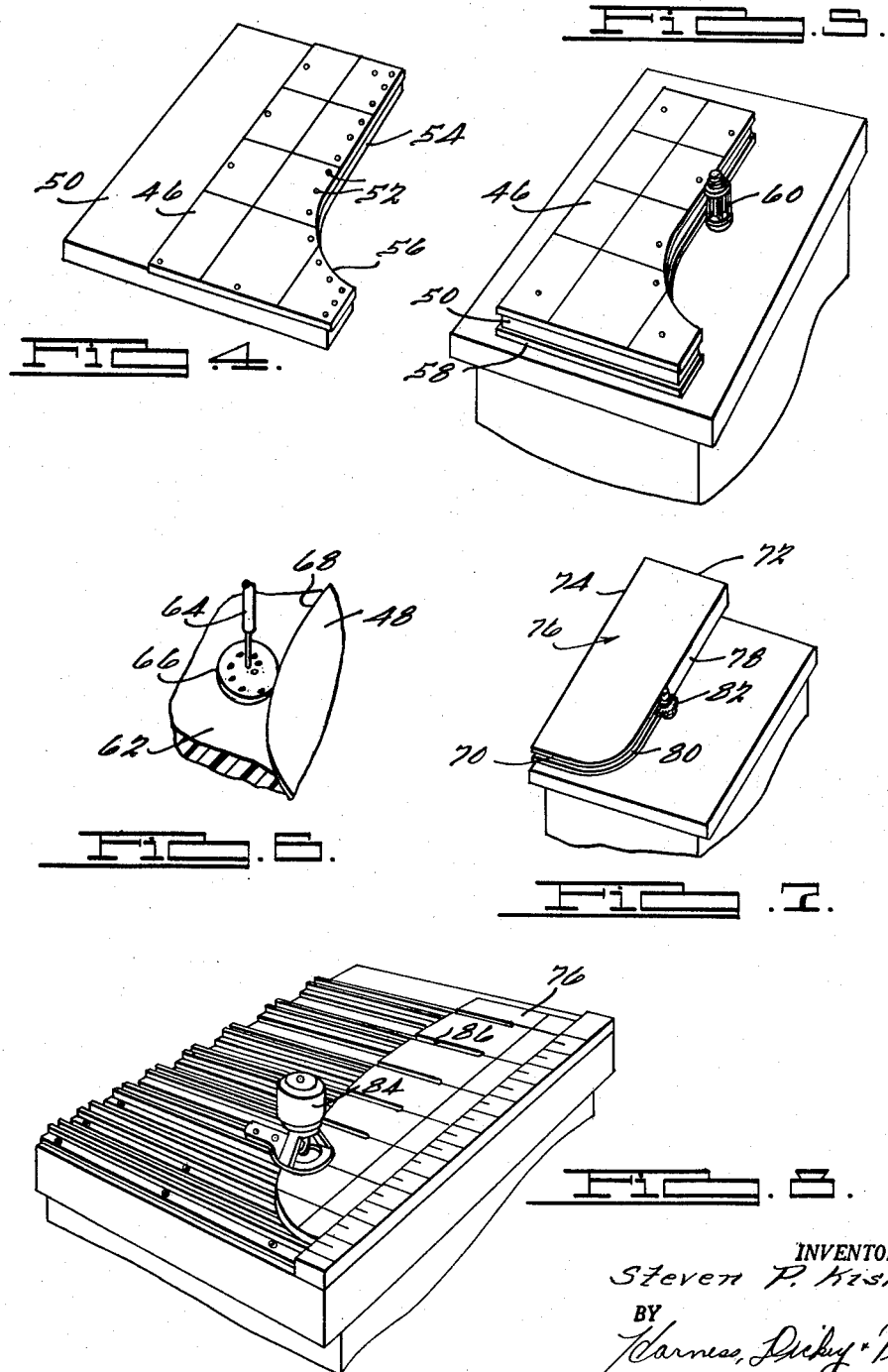

Dec. 15, 1964         S. P. KISH         3,161,555
METHOD OF MAKING PLASTIC FIXTURES
Original Filed Dec. 19, 1958         8 Sheets-Sheet 3
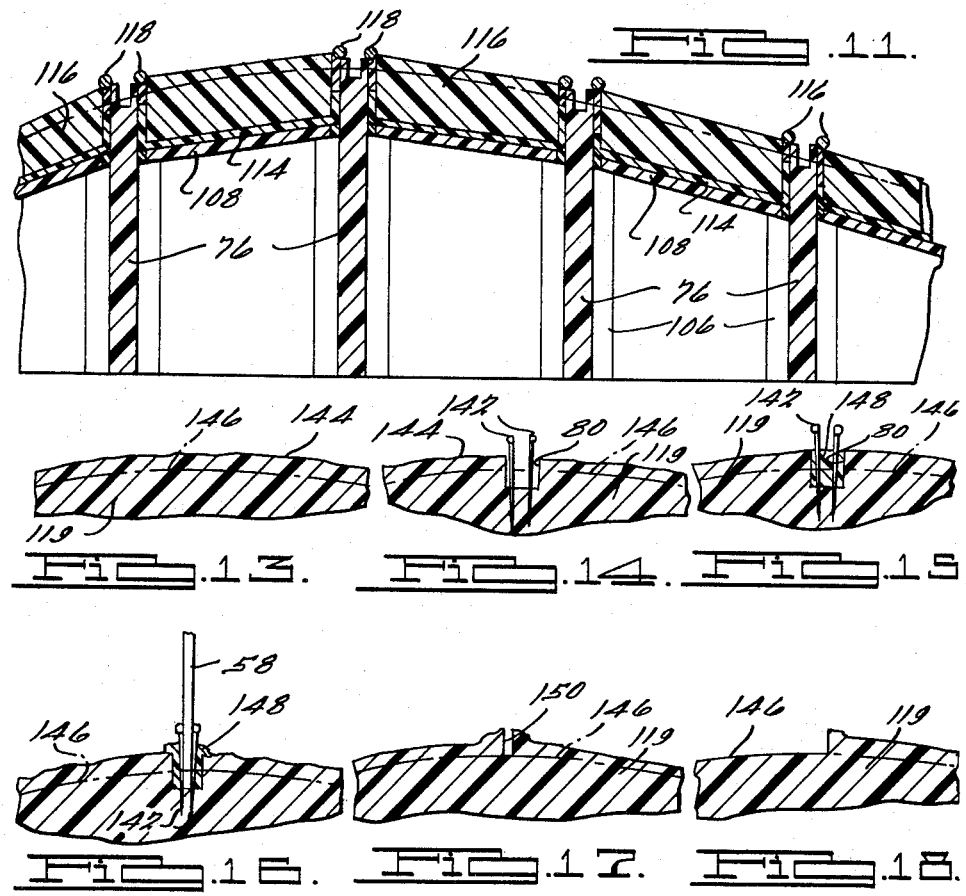
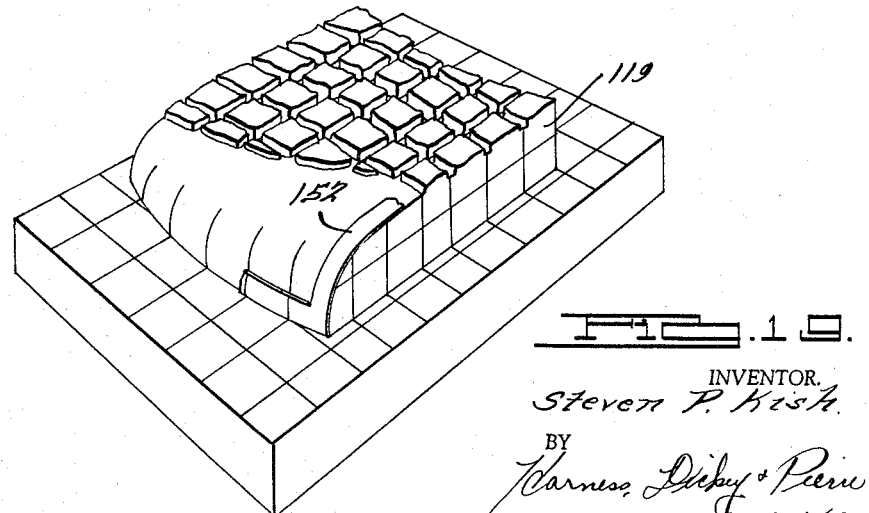
INVENTOR.
Steven P. Kish
BY
Harness, Dickey & Pierce
ATTORNEYS.

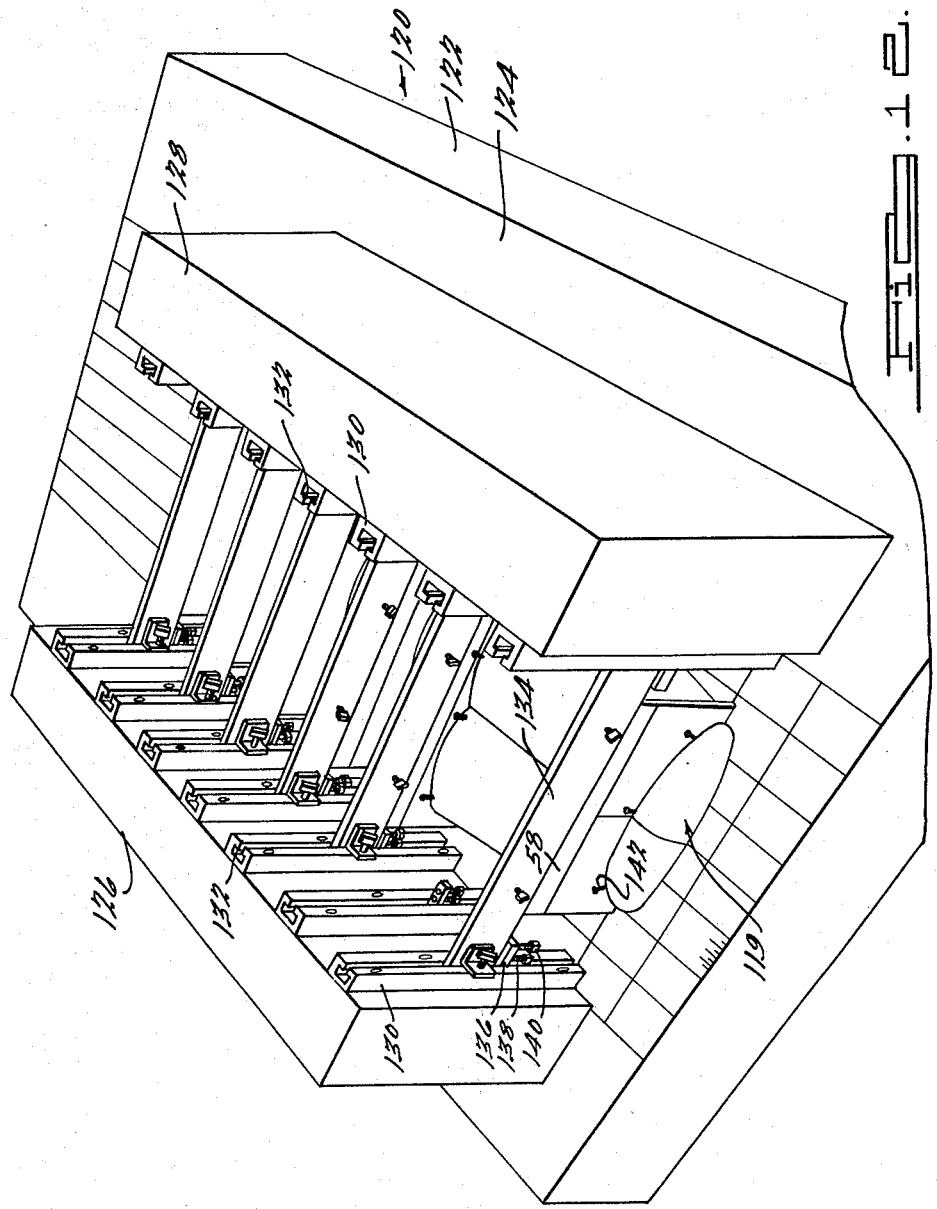

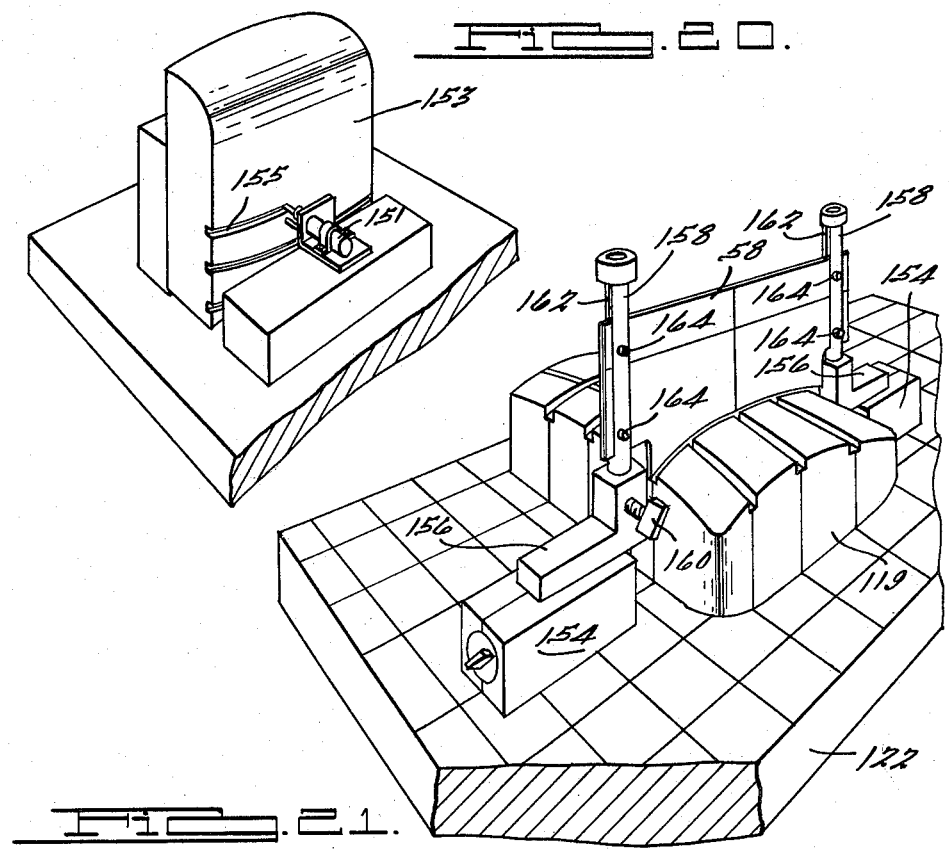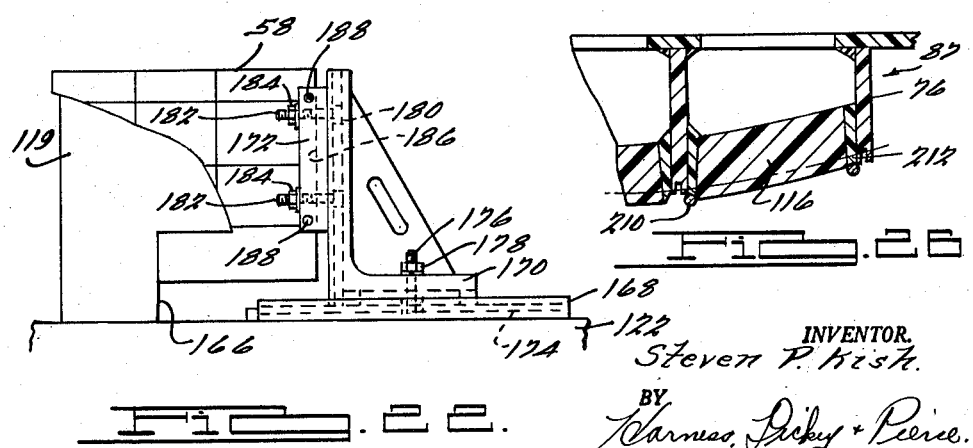

Dec. 15, 1964 S. P. KISH 3,161,555
METHOD OF MAKING PLASTIC FIXTURES
Original Filed Dec. 19, 1958 8 Sheets-Sheet 6
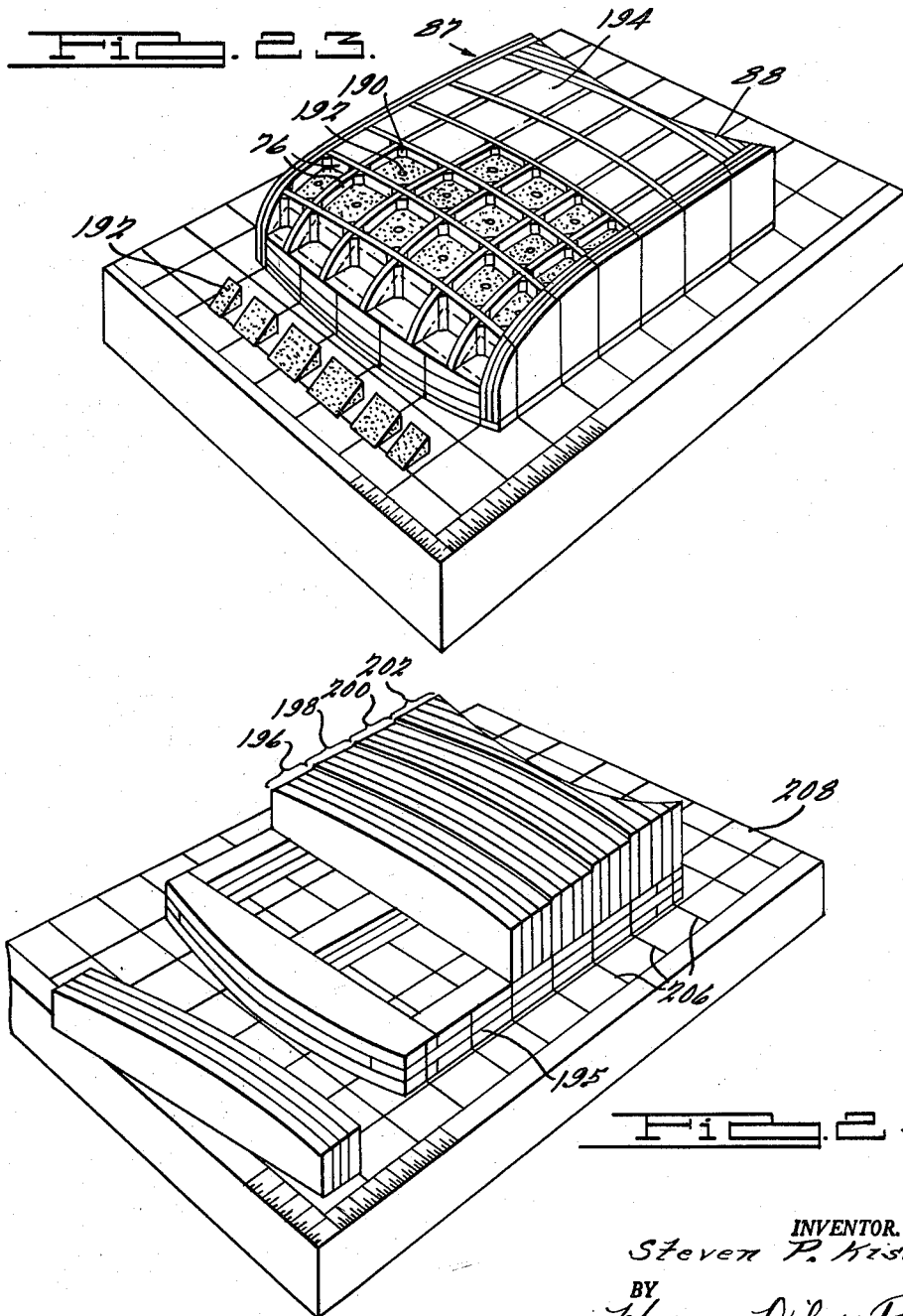
INVENTOR.
Steven P. Kish.
BY
Harness, Dickey & Pierce.
ATTORNEYS.

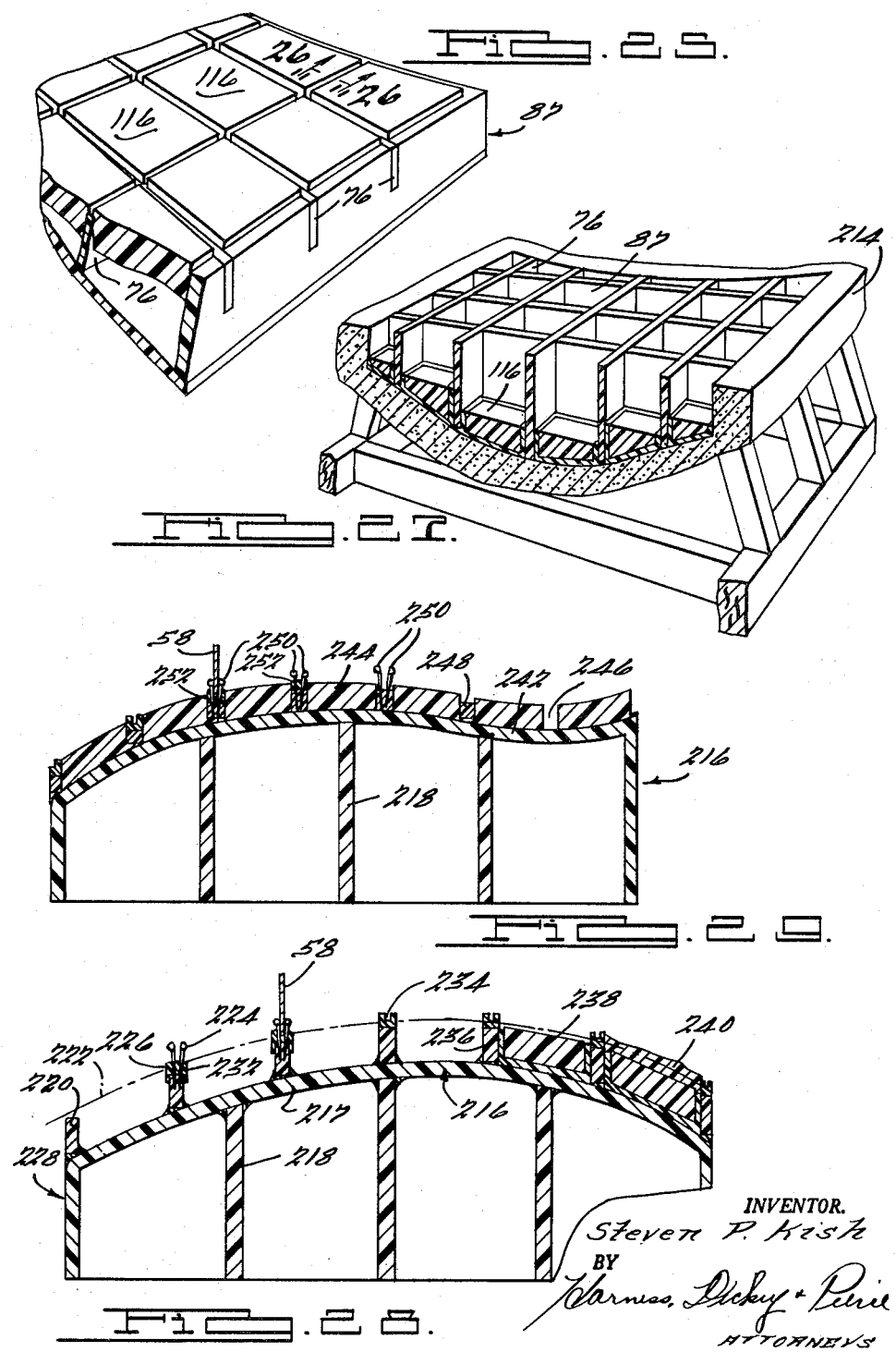

Dec. 15, 1964 S. P. KISH 3,161,555
METHOD OF MAKING PLASTIC FIXTURES
Original Filed Dec. 19, 1958 8 Sheets-Sheet 8
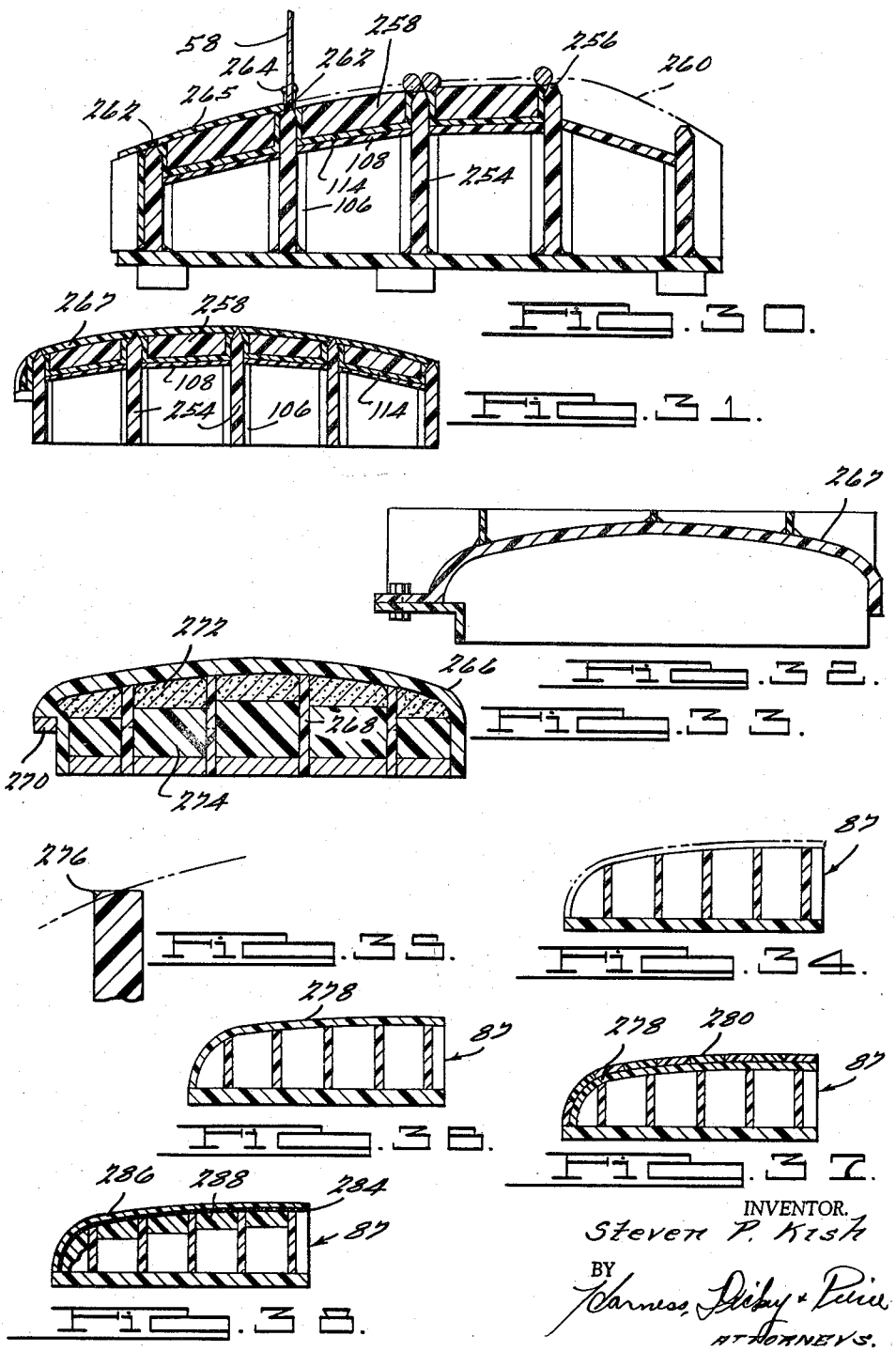
INVENTOR.
Steven P. Kish
BY
Harness, Dickey & Pierce
ATTORNEYS.

United States Patent Office 3,161,555
Patented Dec. 15, 1964

3,161,555
METHOD OF MAKING PLASTIC FIXTURES
Steven P. Kish, 1301 Turner St., Lansing, Mich.
Original application Dec. 19, 1958, Ser. No. 781,522, now Patent No. 3,072,971, dated Jan. 15, 1963. Divided and this application Mar. 23, 1962, Ser. No. 181,926
8 Claims. (Cl. 156—245)

This invention relates to the art of tool or fixture making and is concerned particularly with an improved plastic fixture construction and an improved method of making plastic fixtures and is a division of my copending application Serial No. 781,522, filed December 19, 1958, now U.S. Patent No. 3,072,971.

In the automobile industry, for example, the production of a new body style involves a number of expensive and time consuming tooling operations. The usual procedure, after the new style has been approved, is to make a quarter size three-dimensional model of modeling clay using as guides artists' sketches made during the preliminary planning stage. Any changes deemed necessary or desirable are made to this model, and a full-size clay model is then made again using artists' sketches and perhaps preliminary body drafts that have been made in the meantime.

A master model of wood is then made. This wooden model takes a long time to make and it is expensive. Accordingly, it is very valuable. In addition to the above, it is necessary to have a great many additional fixtures patterned on the master model. For example, it is necessary to have die models for use in the machining of dies to be used in the manufacture of production parts. It is necessary to have spotting racks for checking the production dies. It is necessary to have checking fixtures for inspecting the mass produced parts. In some cases it may be necessary to have hammer forms or other die elements to assist in the manufacture of preliminary or prototype samples of production parts or even in the actual manufacture of the production parts themselves. Also, it is sometimes necessary to have assembly bucks in which the manufactured parts are placed and held securely and rigidly in the desired shape or form while stiffening or reinforcing ribs or the like are welded or otherwise fastened thereto.

The entire tooling operation usually is distributed among a number of different job shops which may be widely separated geographically, and it is necessary therefore to have a relatively large number of duplicate models (or "model duplications" as they are referred to in the trade) which reproduce exactly the form of the master model, for distribution to the various shops in which the actual tools are made. Also, in the course of the tooling operation, it may be necessary to reproduce tool components and to distribute them among the various job shops in order to coordinate the efforts of all the job shop operators and to assure a proper fit between the production parts ultimately produced.

The word "fixture" is used herein as a collective term designating all of the tool devices hereinabove described.

An important object of the present invention is to provide a novel method of making fixtures of plastic resin material which greatly reduces the time required for tooling and correspondingly reduces the expense of tooling.

Another object of the invention is to provide an improved construction for the various fixtures that facilitates and expedites manufacture thereof and that provides an end product of exceptional dimensional stability.

Still another object of the invention is to provide a novel construction for plastic fixtures of the above type that can be made up directly from the engineering drawings or body drafts that almost invariably are made early in the development of a new body style and that does not require the use of the clay models heretofore deemed essential by the automobile industry, at least, as a preliminary step in every tooling operation.

Other objects and advantages of the invention will be apparent during the course of the following description.

In the drawings, forming a part of this specification and wherein like numerals are employed to designate like parts throughout the same, FIGURE 1 is a perspective view showing the manner in which paralin or Celluloid templates are made from body drafts or styling drawings as a preliminary step in the manufacture of fixtures according to the present invention, FIGS. 2 and 3 are perspective views showing female and male templates, respectively, produced as shown in FIGURE 1, FIG. 4 is a perspective view showing one of the paralin templates fastened to a wooden spacer as a subsequent step in the method of this invention, FIG. 5 is a perspective view showing the manner in which permanent aluminum templates are made from the paralin templates, FIG. 6 is a perspective view showing how plastic templates are made from the paralin male templates as another step in the method of this invention, FIG. 7 is a perspective view showing the manner in which male plastic templates are grooved along the contour edges thereof preparatory to assembly as part of a fixture embodying the invention, FIG. 8 is a perspective view showing how the plastic male templates are cut for half-lap assembly in the manufacture of a fixture, FIG. 9 is a perspective view showing a preliminary lattice framework made from the assembled plastic templates, FIG. 10 is a fragmentary sectional view of the lattice framework shown in FIG. 9 and illustrating a further step in the manufacture of the fixture, FIG. 11 is a view similar to FIG. 10 and particularly illustrating a subsequent step in the manufacture of the fixture, FIG. 12 is a perspective view of a special template setting jig illustrating the manner in which aluminum female templates produced as shown in FIG. 5 are used together with the partly completed model shown in FIG. 11 in a subsequent step in the manufacture of a finished fixture, FIGS. 13–18 illustrate progressive steps employed in finishing the fixture after the female templates shown in FIG. 12 are removed, FIG. 19 is a perspective view showing the final step of completing the fixture, FIG. 20 is a perspective view showing a modified plastic form that can be used in place of the lattice framework construction shown in the previous views in the manufacture of fixtures according to the present invention, FIG. 21 is a perspective view showing a modified form of template setting jig, FIG. 22 is a fragmentary elevational view of the modified template setting jig shown in FIG. 21, FIG. 23 is a perspective view showing still another modified form of preliminary fixture construction embodying the invention, FIG. 24 is a perspective view showing still another modified plastic form that can be used in the manufacture of fixtures according to the present invention, FIG. 25 is a fragmentary perspective view showing still another form of plastic frame construction that can be used in the manufacture of the preliminary models or fixtures of this invention, FIG. 26 is a fragmentary sectional view taken on the line 26—26 of FIG. 25 further illustrating the modified construction of FIG. 25, FIG. 27 is a fragmentary perspective view showing still another plastic frame construction that can be used in the manufacture of fixtures according to this invention, FIG. 28 is a side elevational view showing parts in section and particularly illustrating progressive steps in the manufacture of still another plastic frame construction that can be used in the manufacture of finished fixtures embodying the present invention, FIG. 29 is a view similar to FIG. 28 showing a similar modified form of plastic frame construction, FIG. 30 is a vertical sectional view showing still another modified procedure for use in the manufacture of plastic fixtures and tools according to the present invention, FIGS. 31–33 illustrate progressive steps in the manufacture of plastic hammer forms and the like utilizing the novel procedures of this invention, and FIGS. 34–38 illustrate progressive steps in the manufacture of still another plastic frame utilizing and embodying the novel features of this invention.

As suggested, in the automobile industry, body drawings or drafts are prepared as a preliminary step in the production of every new model, and these drawings show the highlight or outline shapes of the various body parts, as well as progressive vertical sectional contour or profile outlines, both longitudinally and transversely, for each body part. Usually, sectional profile views are provided at five inch intervals along the length and width of each part. These styling drawings or body drafts are usually made directly from the artists' sketches and before the three-dimensional preliminary models are made.

It is the purpose of this invention to provide techniques for producing a master model and all of the tooling required for production directly from these styling drawings. In this manner it is possible to eliminate the time and expense heretofore required in the production of preliminary quarter size and full size clay models and the more precise and much more expensive wood models. It is contemplated that the master model and all of the tools be made of plastic by procedures that permit the tooling to be completed much more quickly and much less expensively than heretofore.

To the above end, the styling drawing or body draft 40 is placed on a flat board or base 42 and a separate template is made of each section shown on the drawing. In each instance, the template is made by placing a transparent sheet 44 of paralin or Celluloid on the drawing over the section line to be reproduced. The section line is visible through the transparent material of the sheet 44 and it can be reproduced exactly on the top surface of the sheet using a suitable scribing tool of a type commonly used by draftsmen for this purpose. Thereafter, the sheet 44 is broken apart or separated at the scribe line to produce the female template 46 shown in FIG. 2 and the male template 48 shown in FIG. 3.

A male and a female template is provided in the manner hereinabove described for each section line shown on the drawing 40. Each template so made is suitably numbered or otherwise correlated with the particular section line represented thereby for ease in later identification and use.

Thereafter, it is necessary as an intermediate step in the method of this invention to make a permanent template duplication of each female template 46 as the paralin or Celluloid material from which the original templates are made is too soft, too flexible and too brittle for use in subsequent steps of the method of this invention. The female templates 46 preferably are duplicated in sheet aluminum. To this end, each template 46 is fastened to a board 50 of plywood or the like by thumbtacks 52 or equivalent means. As shown in FIG. 4, the board 50 is approximately the same length as the template 46 and it is formed with a similar profile edge 54 which corresponds to but is recessed or set back from the corresponding profile edge 56 of the template 46. The board 50 is then trimmed flush with the back edge of the template 46 and laid on a sheet of aluminum template stock as shown in FIG. 5. In this arrangement, the board 50 serves as a spacer which permits the sheet of aluminum template stock to be cut to the same identical shape as the template 46 using a cutter 60. The profile edge of the template 46 is used as a guide in making the aluminum template 58. The aluminum templates are then suitably marked for identification and set aside for later use in a manner hereinafter described.

At the same time the female templates 46 are duplicated in sheet aluminum, the male templates 48 or reproduced in oversize dimension using a plastic board material, as shown in FIG. 6. Any suitable plastic material can be used. Epoxy resin materials have been found preminently satisfactory. Plastic boards of a desired thickness can be made conveniently by casting the plastic material in a suitable mold and then curing the cast material to form the board. In any event, each aluminum male template 48 is superimposed on a suitable piece of plastic board material 62, as shown in FIG. 6, and the outline of the template is scratched on the board 62 using a scribing tool 64 or the like and a spacer 66 which keeps the tool a fixed predetermined distance from the profile edge 68 of the template. The ends 70 and 72 and the bottom edge 74 of the template 48 are reproduced exactly on the plastic board 62. Thus, in the template outline, as scribed on the plastic board 62, the ends 70 and 72 and the bottom edge 74 are exactly coincident with the corresponding edges of the aluminum template 48 and the profile or edge thereof is spaced outwardly from or oversize an amount determined by the spacer 66. In practice, the contour edge 68 usually is made about one-eighth inch oversize. The result is the male plastic template 76 shown in FIG. 7.

The plastic templates 76 are relatively thick as shown in the drawing, and the profile edge 78 of each template is formed with a longitudinal, medial groove 80 which can be made in any suitable manner as with a shaper (not shown) having a slotting cutter 82, as illustrated diagrammatically in FIG. 7. The groove 80 should be deeper than the oversize marginal portion made by the spacer 66.

The next step is to assemble the male templates in lattice construction. To this end, the plastic templates 76 are slotted for half-lap assembly as shown in FIG. 8 using a router 84. If the templates are made on five inch centers according to conventional practice they are formed with a plurality of half-lap grooves 86 spaced five inches apart. In order that the transverse and longitudinal templates interfit properly they are grooved from opposite sides. For example, the longitudinal templates may be grooved from the top (FIG. 8) and the transverse templates are then grooved from the bottom (FIG. 9). In each instance the grooves 86 are extended slightly beyond the middle of the template so that there will be no interference when the templates are fitted together in the lattice framework, as shown in FIG. 9.

The lattice framework 87 formed by the interfitted and assembled templates is then fitted in and suitably bonded to an outer ring assembly 88 built up preferably from plastic board material and shaped to plan view templates produced from the body draft 40. Resilient epoxy resin materials are available for use as bonding agents, and, if the plastic templates 76 are made of epoxy resin, they preferably are secured together by a resilient epoxy bonding agent. This bonding material provides some resiliency in the joints between the templates and between the templates and the built-up ring assembly 88 which makes the finished product better able to resist sudden shocks or blows and to better withstand normal handling and abuse. Also, the resilient bonding material tends to relieve stresses in the structure at the joints between the lattice frame members 76 and prevents locally created stresses due to curing of the plastic or other causes from extending across the lattice structure and perhaps compounding their effect to cause warping or twisting of the structure.

When the templates 76 are thus assembled the profile edges thereof collectively define a gridwork of reference lines spaced slightly above a predetermined surface contour defined by the body draft profile lines. Also, the essentially rigid lattice structure 87 formed by the templates 76 clearly embodies in a three-dimensional form the general skeletal shape and contour of the final form to be made therefrom.

Next, the openings or cells of the lattice framework 87 are filled with plastic material. This is best done by fitting precast plastic blocks in the lattice openings to form a shell of sufficient thickness to permit working of the fixture as hereinafter described. To this end a line 90 is scribed on the side wall of each lattice opening a desired distance below the top profile edges of the templates 76 surrounding the opening. The distance the line 90 is spaced below the edges of the templates corresponds to the thickness of the precast block to be inserted in the opening. More particularly, a spacer gauge 92 of the type shown in FIG. 10 conveniently can be used in scribing the depth line 90. FIG. 10 is a progressive view showing three adjacent lattice openings in the fixture. The spacer gauge 92 is in the opening at the left.

The gauge 92 here shown comprises a generally square plate 94 which is sufficiently smaller than the lattice openings so that it fits readily therein and can be easily moved to different inclined positions. However, the plate 94 should fit the lattice openings sufficiently snugly so that the scribe line 90 can be made in each instance simply by running the scribing tool along the edges of the plate 94. In order to hold the plate 94 at the desired uniform depth in the lattice openings, a plurality of L-shaped bolts 96 are attached to the plate 94 adjacent the edges thereof with the threaded shank portions 98 of the bolts extending through the plate substantially at right angles thereto. Wing nuts 100 and 102 on the bolts 96 at opposite sides of the plate 94 hold the bolts securely attached to the plate with the angularly bent terminal portions 104 thereof extending outwardly from and parallel to the plate. Three or four L-bolts 96 are mounted on the plate 94, and the bolts preferably are spaced uniformly around the periphery of the plate.

When the bolts 96 are adjusted with the terminal portions 104 thereof spaced uniformly above the plate 94, they suspend the plate at the desired depth in the lattice openings. It is merely necessary to drop the spacer gauge into one of the lattice openings and the L-bolts 96 automatically position it at the proper depth and at an angle corresponding to the general slope or pitch of that portion of the contour surface in which it is mounted. With the plate 94 suspended in this manner, the scribe line 90 can be formed easily and quickly by running the scribing tool around the four edges of the plate and against the adjacent walls of the opening. Moreover, it will be readily apparent that the spacer gauge 92 can be moved easily and quickly from one lattice opening to the other until scribe lines 90 have been made in each opening. In this connection, it will be apparent that, inasmuch as the lattice templates are spaced uniformly apart, the spacer gauge 92 will fit with substantially the same clearance in all of the lattice openings. Also, it will be apparent that the L-bolts 96 will arrange the plate 94 automatically at the proper pitch or slope to be parallel with the particular portion of the contour surface in which it is mounted.

After all of the lattice openings have been scribed, corner posts 106 are placed in the four corners of each lattice opening with the upper ends thereof flush with the scribe lines 90, as shown in the middle lattice opening of FIG. 10. These posts 106 preferably are of plastic material, and they are bonded to the templates 76 by a resilient resin bonding material of the type hereinabove described.

Relatively thin square plates 108 of plastic board material are then dropped onto the posts 106 as shown in the right lattice opening of FIG. 10. The plates 108 preferably fit the lattice openings relatively snugly and they are joined by a suitable plastic bonding material to the posts and to the adjacent templates 76. Fillets 110 of plastic resin material are then placed along the top edges of the plates 108 and precast blocks 112 are dropped into the lattice openings on top of the plates. The blocks 112 are formed to fit the lattice openings relatively snugly and when they are pressed against the plastic fillets 110, the latter well up into and fill the joints between the blocks 112 and the templates 76. Any excess plastic rising above the blocks 112 is scraped or wiped away. Sufficient fillet material 110 should be placed in the openings to assure complete filling of the joints in every instance. The blocks 112 are sufficiently thick to extend substantially flush with the oversize profile edges of the templates 76. When the plastic fillet material 110 sets or cures, it bonds the blocks 112 solidly in place and forms a monolithic outer shell on the lattice framework 87 which completes and conforms generally to the contour surface defined by the profile edges of the lattice templates 76. Stresses created in the structure by curing of the fillet material 110 are so small as to be insignificant and such stresses as are created are interrupted and localized by the templates 76 and absorbed by the resilient bonding material interconnecting the templates. Substantially the entire mass of the rough fixture shape thus far produced is in the precast components, such as the templates 76, the posts 106, the plates 108 and the filler blocks 112. Thus, while all of these elements are of plastic material none of them, by their mere presence in the fixture, create any great stresses which tend to destroy the dimensional stability of the fixture.

Instead of making the filler blocks 112 close fitting and bonding them in place by fillets 110 of plastic material, as illustrated in FIG. 10, the alternative procedure shown in FIG. 11 can be used. In the alternative method, a quantity of plastic resin material 114 is placed in the lattice openings on the plates 108, and an undersize filler block 116 is dropped into each opening. The blocks 116 are then squashed into the plastic material 114 to cause the latter to rise at least part way up along the sides of the blocks, as shown in the drawing. Preferably, the blocks 116 are pushed into the plastic material at least far enough to bring the top surfaces thereof flush or subsantially flush with the profile edges of the templates 76. Caulking rope or plastic fillet material 118 is then pressed into the joints between the blocks 116 and the templates 76 and the caulking rope preferably is sufficiently oversize so that it wedges into the joint but does not extend any substantial distance therein. A separate caulking rope is provided for each lattice opening so that each piece of caulking rope extends around its respective filler block. The ends of each piece of caulking rope are spaced apart to provide a sprue opening and sufficient additional uncured plastic resin material is then poured into the sprue to fill the joint between the block and the templates. If, in any particular instance, the filler block 116 is inclined from the horizontal, as are those shown in FIG. 11, the sprue opening is provided at the high side of the block to assure complete filling of the joint.

The partially finished plastic fixture hereinabove described is then transferred to a template setting jig 120 which preferably is of the type shown in FIG. 12. The jig 120 comprises a base 122 having a flat top surface 124 and parallel upright side walls 126 and 128 spaced a sufficient distance apart to accommodate the plastic fixture therebetween. Mounted on the inner sides of the walls 126 and 128 are vertical guide bars 130 having confronting ways 132 therein which receive the ends of horizontal slides 134. The latter carry aluminum female templates 58 previously made as hereinabove described and illustrated in FIG. 5.

The guide bars 130 and consequently the templates 58 are spaced the same distance apart as the template lines on the body draft. Thus, if the template lines are taken every five inches according to the conventional practice, the guide bars 130 are spaced five inches apart. Also, the aluminum templates 58 are arranged in the same order as the transverse male templates 76 in the fixture so that each aluminum template 58 is the female counterpart of a corresponding fixture template. Since the aluminum templates 58 are spaced the same distance apart as the plastic templates 76, each aluminum template is directly over its corresponding plastic template and the profile bottom edge of the aluminum template overhangs the groove 80 in its respective plastic template.

The slides 134 are movable vertically in their respective ways 132 to raise or lower the templates 58 carried thereby. Vertically adjustable stops 136 also are carried by the guide bars 130, and the stops are disposed under the slides 134 to limit downward movement thereof. Each stop 136 is held in a desired vertically adjusted position in any suitable or conventional manner to support the slide 134 associated therewith. Each stop 136 has a pair of adjusting screws 138 and 140 which engage and support the slide.

In practice, the stops 136 are positioned at the approximate height specified by the body draft, and the adjusting screw 138 is manipulated to bring the slide 136 to the final adjusted position. It is desirable in this connection that the profile edges of the templates 58 be positioned by screws 138 precisely at the required height above the surface 124. When properly adjusted the profile edges of the templates 58 all are received in grooves 50 in the top surface of the fixture and precisely on the theoretical contour surface of the fixture.

In connection with the foregoing, it will be recalled that the plastic templates 76 were all made oversize so that the profile edges thereof necessarily extend above the height specified by the body draft. It is important in this connection that the excess material thus provided on the profile edges of the templates 76 be sufficient to compensate for any misalignment of the templates that may recur during fabrication of the lattice framework 87 and to compensate for any warping that may occur in the fixture due to stresses created therein as plastic resin material used in its fabrication hardens or sets. By the time the fixture reaches the stage where it is ready to be placed in the template jig 120, it is essentially stable dimensionally. Any error or warping that is going to occur will have occurred by that time and it is an essentially stable permanent article. Also, in every instance, the grooves 80 in the plastic templates 76 are cut deep enough so that they extend below the height specified by the body draft. Thus, the profile edge of every aluminum template 58 is received within and spaced above the bottom of a respective groove 80. If desired, suitable guides such as spaced nails 142 can be provided in the fixture to guide the aluminum templates 58 precisely to a desired location relative to the fixture and to compensate for any flexure or bending of the templates 58 that may occur in the portions thereof extending below the essentially strong and rigid guide bars 134. As suggested, nails conventionally are driven into the plastic material of the fixture to guide the aluminum templates 58 and the preferred procedure is to space the nails in each groove in parallel rows which embrace and closely fit the templates.

After the aluminum templates 58 are positioned and precisely located in the manner described, they are raised to a position above the fixture by means of the adjusting screws 140. All of the grooves 80 are then filled with plastic resin material and the templates are again lowered onto the preset adjusting screws 138 by backing off or retracting the screws 140.

This plastic material is permitted to harden or set and the templates 58 are again disengaged from the fixture by tightening the adjusting screws 140.

The above procedure is then repeated using correspondingly spaced longitudinal aluminum templates 58 in the template setting jig 120.

The amount of material used in the grooves 80 is so small that stress created by curing of this material is never sufficient to warp or twist the fixture itself. The strength, rigidity and dimensional stability of the latter in every instance is sufficient to hold the fixture precisely in its original shape. The final result is a checkerboard of grooves in the top surface of the fixture whose bottom surfaces conform exactly with the contour surface as determined by the sectional profile lines on the body draft. The fixture itself is entirely of plastic and because of the manner in which it is constructed it will not thereafter warp or otherwise change its shape. The profile reference lines established in its contour surface by the aluminum templates 58 are permanent and fixed and precisely according to the shape dictated by the body draft.

Attention is now directed to FIGS. 13–18 which are progressive views showing diagrammatically the steps performed in the template setting jig 120.

More particularly, FIG. 13 shows the fixture 119 having an oversize top surface 144. Specifically, the top surface 144 extends the distance shown above a theoretical finished surface represented by the broken line 146 to which the fixture must be reduced in order to make it conform to the contour surface called for by the body draft. FIG. 14 shows a groove 80 in the oversize top surface 146 of fixture 119 and illustrates the manner in which the groove extends below the theoretical finished surface 146. Also, FIG. 14 illustrates the manner in which guide nails 142 are embedded in the fixture 119 to guide and locate the aluminum templates 58 (not shown). FIG. 15 shows the groove 80 filled with plastic resin material 148. FIG. 16 shows an aluminum template 58 embedded in the plastic resin material 148 with the profile edge thereof on the theoretical finished surface 146. FIG. 17 illustrates the appearance of the fixture after the plastic resin material 148 has dried and become an integral part of the monolithic plastic structure of the fixture. Also, FIG. 17 shows that the bottom surface of the groove 150 which is left when the aluminum template 58 is lifted from the fixture after the plastic material 148 has hardened or set is flush or coincident with the theoretical finished surface 146. Thereafter, the top surface of the fixture 119 is cut back and contoured to the theoretical finished surface 146 by means of conventional woodworking tools using the grooves 150 as references.

FIG. 19 shows the fixture 119 in perspective partially reworked in the manner described. The finished product is a three-dimensional monolithic plastic figure which exactly reproduces the form skeletally represented by the template profiles of the body draft. The form can be made quickly and relatively inexpensively by following the procedures hereinabove described and the resulting form is accurate and dimensionally stable.

It is perhaps significant to note at this point that the above procedure also offers a quick and convenient way to making forms either to inside-of-metal or to outside-of-metal. Both parts may be required for example in the manufacture of production dies. Body drafts conventionally are made to inside-of-metal and the fixture produced in the manner hereinabove described therefore represents the inside-of-metal contour. In order to adapt this fixture to outside-of-metal it is merely necessary to superimpose on the top contour surface of the fixture a sheet 152 of a suitable resin material having the same thickness as the metal to be formed in the dies. For example, a sheet form of epoxy resin is available on the market which is flexible and moldable so as to be readily conformable to the contour surface of the fixture and which is sufficiently hard and tough to withstand handling and abuse to which the fixture normally is subjected in use. The sheet material 152 can be bonded to the fixture 119 in any suitable or conventional manner and it then becomes an integral part of the fixture.

Alternatively, a fixture 153 can be made up of laminated layers of preformed plastic material bonded together or according to any of the procedures herein described but omitting the grooves 80 in the profile edges of the templates. It is then necessary to cut transverse and longitudinal grooves 155 in the top surface of the fixture using a router 157 or the like as illustrated in FIG. 20. In the case of a turtle shell construction of the type hereinafter shown at 216, for example, it is necessary to cut the grooves 155 to the laminated glass backing in order to eliminate or at least reduce stresses which otherwise cause the fixture to warp and lose its original shape. This procedure eliminates the necessity of holding the templates 76 exactly on five inch centers during fabrication of the lattice framework 87 and even permits the use of fixture constructions not having a lattice framework. However, it is not as suitable for certain types of fixtures as the procedure first described.

FIG. 21 shows another form of template setting jig 159 wherein a pair of electromagnetic blocks 154 is employed on the base plate 122 at each of the templates 58. In each instance, the two blocks 154 on each pair are disposed at opposite sides of the fixture 119 as shown in the drawing. Each block 154 carries a mounting element 156 which in turn carries upright post 158 which receives one end of a template 58. In the form of the invention shown, the standards 158 are vertically adjustable in the mounting elements 156 and are held securely in selected adjusted positions by thumb screws 160. Also, in the particular form of jig here shown, the ends of the templates 58 extend through longitudinal slots 162 in the posts 158 and are fastened securely to the posts by set screws 164. This particular form of jig has the advantage that the blocks 154, when demagnetized, can be easily moved about on the base plate 122 to adapt the jig to different types and sizes of fixtures and to different sizes and forms of templates. When the blocks 154 are magnetized they hold securely in the selected adjusted position.

FIG. 22 shows still another form of jig that can be used to advantage in making certain types of fixtures. For example, if the fixture 119 has an undercut side portion, as shown at 166 in the drawing, it may be necessary to form each template 58 in separate halves and to move the two halves of each template in from the side of the fixture. Alternatively, it may occasionally be desirable to use half templates 58 and to finish only one-half of the fixture similarly to the procedure hereinabove described. After one half of the fixture has been finished, the half templates 58 are reversed and the other half of the fixture finished in a similar manner and made symmetrical to the first half following generally the procedure described in my prior Patent No. 2,652,959. This procedure is particularly useful in the manufacture of tools or fixtures having bilaterally symmetrical contour surfaces, particularly when it is or may be necessary or desirable to change or restyle the fixture from the pattern or form indicated by the drawings or body draft.

More particularly, the template setting jig shown in FIG. 22 comprises a base plate 122 which carries transverse slides 168 at template positions. The slides 168, in turn, support uprights 170 to which the templates 58 are attached by clamping blocks 172. In the form of the invention shown, each slide 168 is formed with a T-slot 174, and the upright 170 carries one or more T-bolts 176 which operate in the T-slot. When the nut 178 on T-bolt 176 is loose, the upright 170 can be moved easily back and forth on the slide 168 transversely of the base plate 122 and relative to the fixture 119. Tightening of the nut 178 holds the upright 170 securely in a selected adjusted position on the slide 168. The upright 170 is similarly formed with a vertical T-slot 180 which receives T-bolts 182 carried by the clamping blocks 172. When nuts 184 are loose the clamping block 172 can be easily adjusted vertically on the upright 170, and tightening of the nuts 184 holds the clamping blocks securely in a selected vertically adjusted position. The half template 58 fits into a vertical slot 186 in the clamping block 172, as shown in the drawing, and is securely but detachably attached to the block by set screws 188.

In use, the half template 58 is first moved to the desired height above the base plate 122 by adjusting the clamping block 172 vertically on upright 170 with the latter retracted on the slide 168. After the template has been properly adjusted for height it is moved inwardly toward the fixture 119 to the desired horizontal position whereby to cause the contour profile of the template to make the desired impression on the fixture 119 as hereinabove described. As suggested, the procedure last described can be used with any form of template, but it is particularly advantageous in situations where the fixture has a side undercut condition, as shown in the drawing or in situations where two symmetrical halves of a fixture are to be finished separately.

Attention is now directed to FIG. 23 which shows a modified fixture construction that may be used to advantage under circumstances where it is not necessary to make the fixture conform precisely to the body draft. Ocasionally, the draftsman who prepares the body draft may not intend or want to fix the final form of the fixture. He may, for example, simply set forth the general shape of the contour surface to be reproduced on the fixture. Under these circumstances, the model maker must finish the fixture to the desired final shape. As a matter of fact, the model maker working on a three-dimensional figure frequently can do this easier and better than the draftsman. However, it is necessary for the model maker to have a rough shape that is dimensionally stable with which to work. With this at hand, he can produce the final shape or design by adding to or cutting back the contour surface of the rough form. A quick efficient means for producing the rough form fixture is shown in FIG. 23.

In fabricating the fixture illustrated in FIG. 23, a lattice framework 87 is first made having half lapped templates 76 and suitably reinforced by an outer ring assembly 88 similar to the structure described in connection with the form of the invention shown in FIG. 9. After the lattice framework 87 is constructed, the joints between the transverse and longitudinal templates 76 are reinforced by corner fillets 190 which are suitably bonded to the templates by a resilient bonding agent. As in the form of the invention first described, the bonding agent preferably is an epoxy base resin of a type available on the market. In this form of the invention the fillets 190 preferably extend flush with the upper edges of the templates 76. Thereafter, the lattice openings are partially filled with foam core inserts 192 which conveniently can be made according to the teachings of Patent No. 2,733,221. If desired, the core inserts 192 can be poured and formed in situ, or they can be formed from precast core blocks shaped to fit the lattice openings. In the latter event, the core inserts are suitably bonded to the templates 76.

If the fixture is a relatively shallow one of the type shown in FIG. 23, the core inserts 192 may extend flush with the bottom of the fixture. On the other hand, if the fixture is an essentially deep one, the core inserts 192 may extend only part way down in the lattice openings. In this form of the invention, the core inserts 192 replace and to some extent serve the same purpose as the plates 108 in the form of the invention illustrated in FIG. 10. In any event, they further strengthen and reinforce the lattice framework 87.

Thereafter, top layers 194, preferably of epoxy material, are cast in the lattice openings on the foam core inserts 192 and the surfaces thereof are finished flush with the top profile edges of the templates 76. After curing, the top or surface layers 194 unite integrally with the templates 76 and with the core inserts 192 to form in effect a one piece monolithic plastic form that can be worked and reshaped within limits determined by the thickness of the top surface layers 194.

Plastic resin material of the type used in the fabrication of the fixtures here under consideration can be built up if desired by trowelling additional layers of material on the fixture or selected areas thereof. Material added in this manner unites integrally with the fixture and after curing it in turn can be reworked to a desired shape or form using woodworking tools conventionally used by model makers.

Occasionally, fixtures can be made easily and quickly by procedures illustrated in FIG. 24. In this form of the invention, a lower frame 195 of superimposed pieces of precast plastic resin material such as epoxy resin or the like is built up and shaped to a plan view template as laid out on the drawing or body draft. In fabricating the frame 195 the individual pieces are integrally united by a suitable bonding materal which conveniently can be an epoxy resin identical or simlar to the material from which the pieces are made. Blocks of templates such as those shown at 196, 198, 200 and 202 are then made up in increments corresponding to the spacing of the templates on the body draft. For example, if template profile lines are provided at five inch intervals according to conventional practice, the template blocks are made up in five inch increments.

Each template block comprises a sandwich structure of identical plastic templates suitably bonded together. Any suitable bonding agent can be used for joining the templates, but a resilient epoxy resin bonding agent of the type hereinabove referred to is preferred. Five blocks of templates 196, 198, 200, 202 and 204 are here shown, but it will be apparent that as many additional blocks are provided as are required to fill out the lower frame 195 and to complete the rough form of the fixture. All of the templates in each block preferably are identical and all corresponding to the highest templates in the particular portion of the fixture in which the block is intended to be mounted. After the blocks of templates have been made up they are placed side by side on the base frame 195, as illustrated in FIG. 24, and the various blocks are suitably bonded together and to the base frame. The bonding agent is, of course, permitted to harden to form an integral monolithic structure. Thereafter, the contour surface of the templates can be shaped with conventional woodworking tools employing the edges of the templates on the five inch lines 206 of the base plate 208 as references or guides. This construction is primarily adapted and pre-eminently suited for the manufacture of relatively small fixtures where weight is not particularly significant and where strength is a prime requisite.

FIG. 25 shows an alternative way of mounting the filler blocks 116 in the form of the invention first described. More particularly, instead of mounting the filler blocks 116 on plates 108, as shown in FIG. 11, it may be practical and desirable in some instances to turn the lattice frame 87 upside down, place the filler blocks 116 in their respective lattice openings and then wedge caulking strips 210 between the blocks 116 and the templates 76. As perhaps best shown in FIG. 26, the caulking strips 210 are placed at the bottom of the blocks in the upside down position of the lattice. Epoxy resin material 212 is then cast into the space between the blocks 116 and the templates 76, and when the cast material hardens it integrally unites the blocks with the templates to form a one-piece monolithic structure. In instances where the fixture is relatively small and light in weight or where the surface contour of the fixture is relatively flat, the above procedure can be used to advantage to save time, cost and material. The form thus produced is then finished as described in connection with the first form of the invention.

FIG. 27 illustrates a procedure that sometimes can be used to advantage when an approximate female shape 214 is available. In the automobile industry, for example, the model maker frequently is furnished with a female mold of plaster or the like taken from a preliminary three-dimensional styling dummy of clay, wood or other suitable material as well as body drafts showing the template profile lines for the part. Where this condition obtains, a lattice framework 87 conveniently can be made from the body draft as described in connection with the first form of the invention. The framework 87 is then placed upside down in the female mold 214 as shown in FIG. 27, and precast, formed filler blocks 116 are dropped into their respective lattice openings. Liquid epoxy resin material is then cast into the spaces between the lattice templates 76 and the filler blocks 116. This material flows under the blocks 116 and fills the joints between the blocks and the templates to provide an integral monolithic male form corresponding to the female shape of the casting 214.

Alternatively, liquid epoxy resin material can be placed in the lattice openings before the filler blocks 116 are inserted therein. When this procedure is followed, the filler blocks are simply squashed into the liquid resin causing the latter to well up into the spaces between the blocks and the lattice templates. When the liquid resin material is cured it unites with the lattice templates 76 and the filler blocks 116 to form a one-piece monolithic structure. Manifestly, this procedure offers a fast, efficient and inexpensive way of making male fixtures of various types.

FIG. 28 illustrates still another procedures that can be used to advantage when a female form such as the one shown at 214 in FIG. 27 is available. In this form of the invention, a construction 216 referred to in the trade as a laminated turtle shell is first made from the plaster mold 214. A turtle shell 216 is made by laying plastic impregnated layers of fibrous material on the surface of the mold 214 and then curing the resin. Cloth of glass or asbestos fibres commonly is used for this purpose. If necessary or desirable the shell 217 thus formed can be strengthened and reinforced by longitudinal and transverse ribs or partitions 218. The procedures and techniques used in forming the turtle shell 216 are well known in the art and need not be described here in detail.

Risers 220 of epoxy resin boarding material or the like are then bonded to the top of the turtle shell 216 in half lapped lattice form. The risers are formed similarly to the lattice framework 87 described in connection with the first form of the invention. However, it should be noted that in this instance the risers are cut to be below the desired contour surface of the fixture. In FIG. 28, the theoretical finished contour surface is represented by the broken line 222. The risers 220 are spaced the same distance apart as the templates of the body draft and form seats for female aluminum templates made as described in connection with the first form of the invention. Preferably nails 224 are driven into the upper edges of the risers 220 astraddle the template locations to guide the female templates into position on the risers. Tape 226 is then placed on the sides of the risers 220 to extend upwardly therefrom alongside the nails 224.

The form 228 thus produced is then placed in a template setting jig similar to the one shown at 120 in FIG. 12, and female templates 230 of aluminum or the like made in the same manner as the aluminum templates 58 hereinabove described are placed in the jig. Strips of epoxy resin 232 are then placed on the risers 220 between the tapes 226 to a height above the theoretical contour finish surface at 222. The aluminum templates 230 are then lowered in the template setting jig 120 (not shown) to penetrate the epoxy resin strips 232. When the resin 232 hardens, grooves 234 remain which bottom on the theoretical contour surface 222.

Additional epoxy resin 236 is then placed in the lattice openings defined by the risers 220 and precast epoxy filler blocks 238 are set in the plastic resin 236. The latter fills the space between the blocks 238 and the turtle shell 216 and wells up into the joints between the filler blocks and the risers 220, as clearly shown in the drawing. The filler blocks preferably are formed to extend entirely below the theoretical contour surface 222. The hardened resin strips 232 are finished flush with the bottoms of the grooves 234. Additional plastic epoxy material 240 is then trowelled into the lattice openings between the risers and finished to the reference lines established by the grooves 234.

FIG. 29 shows a variation of the procedure described in connection with FIG. 28. In this form of the invention a turtle shell 216 is made similarly to the one shown in FIG. 28 using a mold 214. After the turtle shell 216 is finished and the plastic material used in its construction has hardened or set, it is replaced in the female mold 214 with the top surface 242 thereof suitably spaced by means of plastic spacers or the like from the corresponding confronting surface of the mold. The contour surface of the mold 214 is preconditioned with a suitable parting compound and plastic resin material such as epoxy resin or the like is then poured or cast into the space between the mold 214 and the turtle shell 216. When the resin material has hardened, it forms a top layer 244 on and integrally united with the turtle shell 216 exactly reproducing the contour surface of the mold. Manifestly, this surface corresponds generally to the theoretical finished contour surface as determined by the profile or template lines of the body draft.

It should be kept in mind, however, that the mold 214 is at best a rough form. It may be and usually is a plaster cast made from an unfinished clay styling dummy. Thus, the contour surface of the top resin layer 244 conforms generally to the desired finished surface of the fixture, but it may be rough and unfinished and it may deviate in varying degree from the desired finished surface.

Thereafter, grooves 246 are cut transversely and longitudinally in the plastic layer 244 at template locations, and these grooves preferably extend down to the laminations of the turtle shell 216 so as to break up and interrupt stresses created in the layer when the resin material cures. It is contemplated that the grooves 246 be filled with additional plastic resin material. Accordingly, preparatory to doing this, the sides of the grooves 246 are first coated with a thin layer of resilient epoxy which prevents stresses in various portions of the layer 26 from being transmitted to other portions thereof and perhaps compounding so as to cause the fixture to warp or twist out of its final shape. A plastic epoxy material 248 is then cast in the grooves 246 within a quarter of an inch or so from the top surface of the layer 244. Spaced rows of nails 250 are embedded in the epoxy layers 248 to locate the templates precisely in the manner hereinabove described. The grooves 246 are then filled with additional epoxy material 252, and aluminum templates 58 are embedded therein using a template setting jig of the type shown in FIG. 12, for example. Both the templates 58 and the nails 250 are removed when the epoxy layers 252 have hardened, and the surface layer 244 of hardened resin is then reworked using the profile lines established by the templates 58 as references.

In the form of the invention shown in FIG. 30, a lattice framework is made which is similar to the one shown in FIG. 11 except that plastic templates 254 having tapered upper profile edges 256 are used in place of the templates 76. Also, the tapered edges 256 are not cut oversize as are templates 76 but are made precisely to the profile outlines of the body draft. Precast blocks 258 of epoxy resin or the like are used in place of blocks 116 shown in FIG. 11, and the blocks 258 are set below the theoretical final contour surface 260 of the fixture and below the edges of the templates 254.

Thereafter, after all of the resin material used in the fixture has set and the latter has taken any slight warp or twist that may occur due to stresses created by the resin as it sets, strips of moldable or plastic resin material 262 are placed on the profile edges of the templates 254, spaced rows of nails 264 are embedded in template positions and aluminum templates 58 are "set" using a template setting jig of the type shown in FIG. 12. After the plastic resin material 262 has hardened, the templates 58 and nails 264 are removed and a thin upper layer 265 of plastic resin material is trowelled on the blocks 258 and finished flush with the reference lines established in the resin material 262 and templates 58. Once the heavy, strong and rigid base frame has set and taken its warp or twist, it will not be affected by stresses created as the resin material 262 and 265 cures. The above procedure is applicable particularly when it is desired to make draw die patterns before the finished die model is available.

In some instances where the fixture need not conform exactly to the shape established by the body draft, it is possible to follow the general procedure described in connection with the form of the invention shown in FIG. 30 but omitting the resin layers or strips 262 on the templates 254 and the step of setting the templates 58. As shown in FIG. 31, it is possible in some situations simply to coat the blocks 258 with a thin top layer of plastic resin material 267 and to finish the top surface of the fixture flush with the bevelled upper edges of the templates 254. This procedure is particularly applicable in making draw die castings, hammer forms and, in some cases, Keller models.

FIGS. 32 and 33 show a convenient way of making hammer forms from a fixture constructed according to any of the procedures hereinabove described. The first step in the manufacture of a hammer form according to the present invention is to make a turtle shell or reinforced female fibre glass lamination 267 of the fixture. The lamination 267 is made according to conventional practice by first coating the surfaces of the fixture to be reproduced with a suitable parting compound and then laying thereon resin impregnated layers of suitable fibrous materials such as glass or asbestos cloth or the like. When the resin material has hardened or set the shell 267 thus formed is removed and the lamination is complete. If necessary or desirable, the laminated shell 267 can be reinforced as shown in the drawing either at the time the shell is made or as a subsequent step.

A male laminated form 266 is then made in a similar manner using the female lamination 267 as a mold, and the male shell is suitably reinforced by longitudinal and transverse partitions 268 (FIG. 33). Metal inserts 270 are or may be provided on the shell at sharp flange locations and the cells defined by the partitions 268 are filled or partially filled with resin layers 272 which are heavily loaded with sand. In practice, about 20% resin and 80% sand has been found satisfactory. Bolster plates 274 are provided in the cells behind the sand cores 272 to hold the latter packed in the upper portions of the cells. The sand 272 absorbs hammer shock and assures an essentially strong fixture capable of withstanding the exceedingly rough treatment and abuse to which it normally is subjected in use.

In the form of the invention shown in FIG. 34, a lattice framework 87 is made up similarly to the one described in connection with the first form of the invention except that the lattice templates are made undersize rather than oversize. It is intended that the framework 87 be covered by a preformed sheet of flexible material such as a form of epoxy resin readily available on the market and the templates are made undersize by an amount equal to the thickness of the sheet material to be used for the covering. After the lattice framework 87 has been assembled, the edges of the templates are splined off as indicated at 276 in FIG. 35 and a sheet 278 of flexible epoxy material is applied hot to the framework as shown in FIG. 36.

Flexible epoxy sheet material is available having about the same thickness and the same flexibility and working qualities as leather. The resin sheet flexes and bends readily and can be conformed easily to the lattice shape. Heating the resin sheet assists in adapting it to the contour of the framework and causes it to retain a final shape.

After the plastic sheet material 278 has been formed and shaped to the contour of the framework 87 it is adhesively united to the contacting edges of the lattice templates in any suitable or conventional manner. If the shape of the fixture permits, the sheet 278 of plastic resin material can be applied in one piece to the lattice framework 87. However, if the contour surface of the framework 87 is complex or relatively large it may be necessary to break the skin or covering 287 into several pieces. For example, it may be desirable to apply the covering in the form of a plurality of longitudinal strips suitably placed side by side in butting contiguous relation.

If the form of the lattice framework 87 demands or if additional stiffness is desired in the finished fixture, a second layer 280 of sheet epoxy resin is applied over the first. If the first layer 278 of sheet material is applied in the form of longitudinal strips in the manner hereinabove described, the second layer 280 preferably also is formed in strips which are laid transversely to the strips in the first layer. When double layers of sheet material are to be used it is of course necessary to undercut the profile edges of the lattice templates a corresponding amount.

Alternatively, additional stiffness in the finished fixture can be obtained by filling or partially filling the lattice openings with cast resin 282 which preferably is of the expanded form described in Patent No. 2,733,221 hereinabove referred to. The expanded resin backing layers 282 can be cast in situ simply by turning the fixture upside down and pouring the desired amount of the resin material into the lattice openings. The cast material unites integrally with the covering layer 278 and with the portions of the lattice templates contacted thereby to form a solid rigid structure. Any surface irregularities in the sheet material forming the surface layer 278 can be corrected by trowelling thin layers of resin on the affected areas.

An alternative procedure providing a skin covering for the undersize lattice framework 87 shown in FIG. 34 is to cover the undersize profile edges of the framework with a suitable screen or mesh material 284 which preferably also is of plastic resin material. A layer of moldable resin material 286 is trowelled on the screen material 284 and finished to the desired surface contour. The profile edges of the templates in the framework 87 of course conform the screen 284 generally to the desired surface contour, and the screen supports the resin surface layer 286 while it is being shaped to the desired contour and during the period required to harden or set the resin material. This procedure is particularly applicable in the manufacture of master models and the like and in situations where the final shape need not conform precisely to the body draft. Manifestly, the above fixture can be strengthened and reinforced if necessary or desirable by casting an expanded resin core material 288 in the lattice openings, as shown in FIG. 38.

It will thus be seen that I have achieved the objects of my invention. I have provided a novel construction for plastic tools or fixtures which greatly reduces the time required for tooling and correspondingly reduces the expense of tooling. Fixtures made according to the teachings of this invention are exceptionally stable dimensionally. The novel structure and method described permits preliminary models and possibly the entire tooling program to be made up directly from engineering drawings or body drafts and thus permits the tooling program to be launched at an earlier stage than has heretofore been possible.

Having thus described the invention, I claim:

1. The method of making plastic fixtures comprising making a rough shape of laminated layers of preformed plastic material bonded together, said shape having a surface approximating and extending above a predetermined surface contour to be duplicated on the fixture, forming grooves in the mentioned surface of said shape extending below said predetermined surface contour, placing a moldable plastic material in said grooves to a level above said predetermined surface contour and establishing reference lines on said contour by impressing templates conforming to said lines in said plastic material and then curing the plastic material to fix said reference lines, and then conforming the areas of said shape between said grooves to said predetermined surface contour using said reference lines as guides.

2. The method of making a plastic die model or the like to outside-of-metal comprising building a rough shape corresponding generally to the fixture and having a surface approximating but disposed above a predetermined inside-of-metal surface contour of said model, forming grooves in the mentioned surface of said model extending to a point below said predetermined surface contour, placing a moldable plastic material in the grooves to a level above said predetermined surface contour and establishing reference lines on said contour by impressing templates conforming to said lines in said plastic material and curing the plastic material to fix said reference lines, then conforming the portions of said model between said reference lines to said predetermined surface contour using said reference lines as guides, and then superimposing and bonding to the finished surface of said model a plastic sheet material of metal thickness to produce a finished outside-of-metal surface contour.

3. The method of making available a male fixture from an available female shape comprising fabricating a lattice framework of interfitted preformed templates having edge profiles conforming generally to the female surface contour to be reproduced, inserting said lattice framework into said female shape with the edge profiles of the templates resting on the mentioned surface to be reproduced, inserting undersized filler blocks of preformed plastic material in said lattice openings, and then pouring a curable plastic material into said lattice openings and between said filler blocks and said templates whereby to cause said plastic material to flow under said filler blocks and the profile edges of said templates to reproduce the surface of said female shape, and then curing said curable plastic material, said templates interrupting and localizing stresses created in the fixture by curing of said curable plastic material to render said fixture relatively dimensionally stable.

4. The method of making plastic fixtures comprising fabricating a lattice framework of interfitted preformed plastic templates having edge profiles conforming approximately to but disposed below a predetermined surface contour, placing preformed filler blocks of plastic material in the lattice openings with the top surfaces of said blocks below said predetermined surface contour and bonding said filler blocks to said templates, placing a moldable plastic material on the profile edges of said templates to a level above said predetermined surface contour and establishing reference lines on said contour by impressing templates conforming to said lines in said plastic material and then curing the plastic material to fix said reference lines, then placing additional plastic material in the lattice openings and on said filler blocks and then conforming the plastic material in said lattice openings to said predetermined surface contour using said reference lines as guides.

5. The method of making a plastic fixture comprising building a rough shape of plastic material corresponding generally to the fixture and having a surface approximating but disposed below a predetermined surface contour of said fixture, placing spaced strips of moldable plastic material on the mentioned surface of said shape and establishing reference lines on said predetermined surface contour by impressing templates conforming to said lines in said strips of plastic material, and curing the plastic material to fix said reference lines, then filling the areas between said reference lines with layers of plastic material and conforming said areas to the predetermined surface contour using said reference lines as guides, and curing the plastic material in said conformed areas to produce the finished fixture.

6. The method of making a plastic fixture comprising building a rough shape of plastic material corresponding generally to the fixture and having a surface approximating but disposed below a predetermined surface contour of said fixture, placing spaced strips of moldable plastic material on the mentioned surface of said shape and establishing reference lines on said predetermined surface contour by impressing templates conforming to said lines in said strips of plastic material, curing the plastic material to fix said reference lines, then filling the areas between said reference lines with thin layers of plastic material and conforming said areas to the predetermined surface contour using said reference lines as guides and curing the plastic material in said conformed areas to produce the finished fixture, making a female mold of the finished surface contour of said shape, forming a shell in said mold reproducing said surface contour and duplicating the corresponding surface contour of said model, fabricating a lattice framework conforming approximately to said shell and inserting said framework into the shell and bonding the shell and framework together so that said framework strengthens and reinforces said shell, then at least partially filling the lattice openings with a granular material such as sand and the like, casting plastic material in the lattice openings on said granular filler to retain the latter in said openings, and then curing said overlays.

7. The method of making plastic fixtures comprising fabricating a lattice framework of interfitted preformed plastic temuplates having edge profiles conforming to a predetermined surface contour and defining reference lines on said surface contour, inserting preformed filler blocks in the lattice openings and bonding the same to said templates with the top surfaces thereof disposed below said predetermined surface contour, then casting moldable plastic material in the lattice openings and on said filler blocks and conforming said plastic material to said predetermined surface contour using reference lines established by the profile edges of said template as guides and curing said plastic material to form a unitary monolithic structure.

8. The method of making plastic fixtures comprising fabricating a lattice framework of interfitted preformed plastic templates having edge profiles conforming to a predetermined surface contour and defining reference lines on said surface contour, placing corner posts in the lower portions of the lattice openings at the intersections of said templates and securing the same to said templates, mounting supporting plates in the lattice openings on said corner posts, placing preformed filler blocks in the lattice openings above said supporting plates with the top surface of each block below the profile edges of the templates adjacent thereto, bonding said blocks to said templates and said supporting plates with additional plastic material, then casting layers of plastic material in said lattice openings on said filler blocks, and conforming said plastic layers to said predetermined surface contour using the reference lines established by the template profiles as guides.

References Cited in the file of this patent

UNITED STATES PATENTS

| | | |
|---|---|---|
| 2,652,595 | Kish | Sept. 22, 1953 |
| 2,715,280 | Kish | Aug. 16, 1955 |
| 2,724,868 | Kish | Nov. 29, 1955 |
| 2,750,632 | Kish | June 19, 1956 |
| 2,776,453 | Kish | Jan. 8, 1957 |
| 2,777,790 | Kish | Jan. 15, 1957 |
| 2,850,890 | Rubenstein | Sept. 9, 1958 |
| 2,977,639 | Barkhuff et al. | Apr. 4, 1961 |
| 3,027,290 | Valore | Mar. 27, 1962 |
| 3,072,971 | Kish | Jan. 15, 1963 |